United States Patent [19]

Michener

[11] Patent Number: 4,888,768

[45] Date of Patent: Dec. 19, 1989

[54] FRAME FORMAT FOR VIDEO CODEC

[75] Inventor: James A. Michener, Grass Valley, Calif.

[73] Assignee: The Grass Valley Group, Inc., Nevada City, Calif.

[21] Appl. No.: 69,682

[22] Filed: Jul. 6, 1987

[51] Int. Cl.⁴ ............................................. H04J 3/22
[52] U.S. Cl. ..................................... 370/102; 370/112
[58] Field of Search ..................... 370/102, 99, 110.11, 370/111, 112, 84

[56] References Cited

U.S. PATENT DOCUMENTS

| | | | |
|---|---|---|---|
| 4,538,286 | 8/1985 | McNesby et al. | 370/102 |
| 4,553,129 | 11/1985 | McNesby et al. | 370/102 |
| 4,558,445 | 12/1985 | Novick | 370/102 |
| 4,649,536 | 3/1987 | Krinock | 370/102 |
| 4,661,966 | 4/1987 | Schreiner | 370/102 |

Primary Examiner—Douglas W. Olms
Assistant Examiner—Min Jung
Attorney, Agent, or Firm—Francis I. Gray

[57] ABSTRACT

A frame format for a video codec combines video data at a video subcarrier frequency with up to five data channels at a DS1 digital telecommunications data rate and an optional audio/telephone channel. Video data is sampled and input to a stuff FIFO at the subcarrier frequency rate and output to a multiplexer at a DS3 digital telecommunications data rate. A stuff word is generated for each DS3 data subframe and contains either a valid data bit or a garbage data bit, as indicated by a stuff flag contained in the stuff word, to compensate for the difference in input and output data rates from the stuff FIFO. The DS3 master frame generated by a multiplexer from the video data and the other data channels is transmitted and decoded at the receiving end in a reverse manner.

10 Claims, 2 Drawing Sheets

FRAME FORMAT FOR VIDEO CODEC

BACKGROUND OF THE INVENTION

The present invention relates to digital coders/decoders, and more particularly to a frame format for a video codec for transmission of video data over a digital transmission network at a DS3 level while providing for incorporation of information at a DS1 level.

A digital transmission network is made up of sources of digital signals, including channel banks and multiplexes, and transmission facilities. These operate at different bit rates. At any one level in the digital hierarchy there may be several signal sources with unique bit stream formats, but they must have certain common characteristics to permit interconnection with transmission facilities at that level, and multiplexes connecting to a higher level. The designation DSN refers to those common features of the digital signal at the Nth level in the network as defined by Technical Advisory No. 34 by American Telephone and Telegraph Company, Network Planning and Design Department, Basking Ridge, N.J. The present levels in the Bell System digital network include DS1 (1.544 Mb/s) and DS3 (44.736 Mb/s).

For the transmission of video information over the digital transmission network the DS3 level is used. The DS3 format as shown in FIG. 1 consists of a master frame having seven subframes, each subframe having eight 85-bit words as shown in FIG. 1, and must be used by all DS3 sources. Each 85-bit word has 84 information bits and one control bit. A frame alignment signal (F1F0F0F1) is used to identify all control bits, and a multiframe alignment signal (M0M1M0) is used to locate all seven subframes. At the beginning of the first and second subframes are X-bits which must be identical in any one master frame, i.e., either 11 or 00. The X-bits may be used by a DS3 source for asynchronous low speed signaling. The source may not change the state of the X-bits more than once every second. At the beginning of the third and fourth subframes is a P-bit which contains parity information. DS3 sources must count parity over the information bits ($8 \times 84 \times 7 = 4704$) following the first X-bit in a master frame and insert the resulting parity information in the P-bit positions of the following frame. PP=11 if the digital sum of all information bits is 1 and PP=0 if the digital sum of all information bits is 0. The remaining control bits, called CB, are used by DS3 sources.

For NTSC video the subcarrier frequency is 3.579545 MHz. If the video is sampled at 2.5 times the subcarrier frequency and digitized to four bits, the video bit rate is 35.795454 Mb/s. For transmission over the digital transmission network using the DS3 format it is necessary to place the video bit data at 35.795454 Mb/s into the DS3 format at 44.736 Mb/s. Prior television codecs use the DS3 clock as the sample rate. Since the DS3 rate is asynchronous with the video rate, the result is a certain amount of chroma noise and sampling related chroma artifacts.

What is desired is a video codec which can encode and decode video data into a DS3 frame format for transmission over the digital transmission network to provide video data with reduced chroma noise and sampling related chroma artifacts while permitting more data space for additional data within the DS3 frame, such as DS1 and/or other ancillary data.

SUMMARY OF THE INVENTION

Accordingly the present invention provides a frame format for a video codec which enables the transmission of video data plus up to five DS1 data channels and an optional audio or telephone channel in a single DS3 frame format. Digitized video data is input to a stuff FIFO buffer which is clocked at the input at the slower clock rate of the video data. The data is clocked out from the FIFO at a fast DS3 rate to a multiplexer. For every subframe of a DS3 master frame an enable signal is sent from a control circuit to enable the generation of a stuff word having at least a flag bit and a data bit, the flag bit indicating whether the data bit is real or garbage, to add an extra video data bit to a subframe to maintain synchronization of the video data with the fast DS3 clock. If the FIFO is almost full, i.e., has an extra bit that has not been read out, then the stuff word is generated with the extra actual data bit and a stuff flag is set. However if the FIFO is empty, then the stuff word is generated with a garbage data bit and the stuff flag is not set. The subframe of video data including the stuff word is combined with up to five DS1 channels in the multiplexer to fill the DS3 master frame format and output as a DS3 output signal. One of the bits of the stuff word may be used for ancillary data for telephone audio data or for the audio corresponding to the video.

The objects, advantages and novel features of the present invention will be apparent from the following detailed description when read in conjunction with the appended claims and attached drawing.

DESCRIPTION OF THE PREFERRED EMBODIMENT

With a video input signal being sampled at 2.5 times the subcarrier frequency of 3.5795454 MHz and with four bits per sample, the video input bit rate is ten times subcarrier, or 35.795454 Mb/s. The DS3 clock rate is 44.736 Mb/s so that the subframe frequency is 65.788 kHz. Therefore the total number of video samples per DS3 subframe is 544.1 samples. Since partial samples cannot be transmitted, this requires that each subframe contain 544 samples of video data with every ninth or tenth subframe adding an additional data bit to stay in synchronization with the DS3 rate. To provide this additional data bit a stuff word of eight bits is added to the video data which results in a total sample rate for the video data of 552 samples per subframe. The stuff word as used in the described embodiment has five bits that are used as a stuff flag with majority logic being used for decoding. If the stuff flag is set, then the data bit location contains the extra video bit for that subframe, otherwise the data bit location is garbage. Another bit of the stuff word may be used for subframe parity, and a final bit may be used for ancillary data, such as the audio corresponding to the video or as a telephone data channel since the msubframe rate of 65.788 kHz is approximately the same as the telephone data rate of 64 kHz. Thus the stuff word appears as follows:

bit number: 1 2 3 4 5 6 7 8 meaning: F F F F F D P A where F is the stuff flag (all bits are identical), D is the data bit (either real or garbage depending upon the stuff flag), P is the parity bit for the last subframe, and A is the ancillary data bit. Since the total number of data bits available per subframe is 8*84 or 672, there are 120 unused data bits per subframe, or 7.894 Mb/s which allows for five channels of DS1 data at 1.579 Mb/s each. Since the actual DS1 data rate is 1.54 Mb/s, a similar bit stuffing technique is used for each DS1 signal. Therefore, a single DS3 channel according to the present invention can provide to the user a video channel of data, an audio or telephone channel of data and up to five DS1 data channels.

Figure 1:
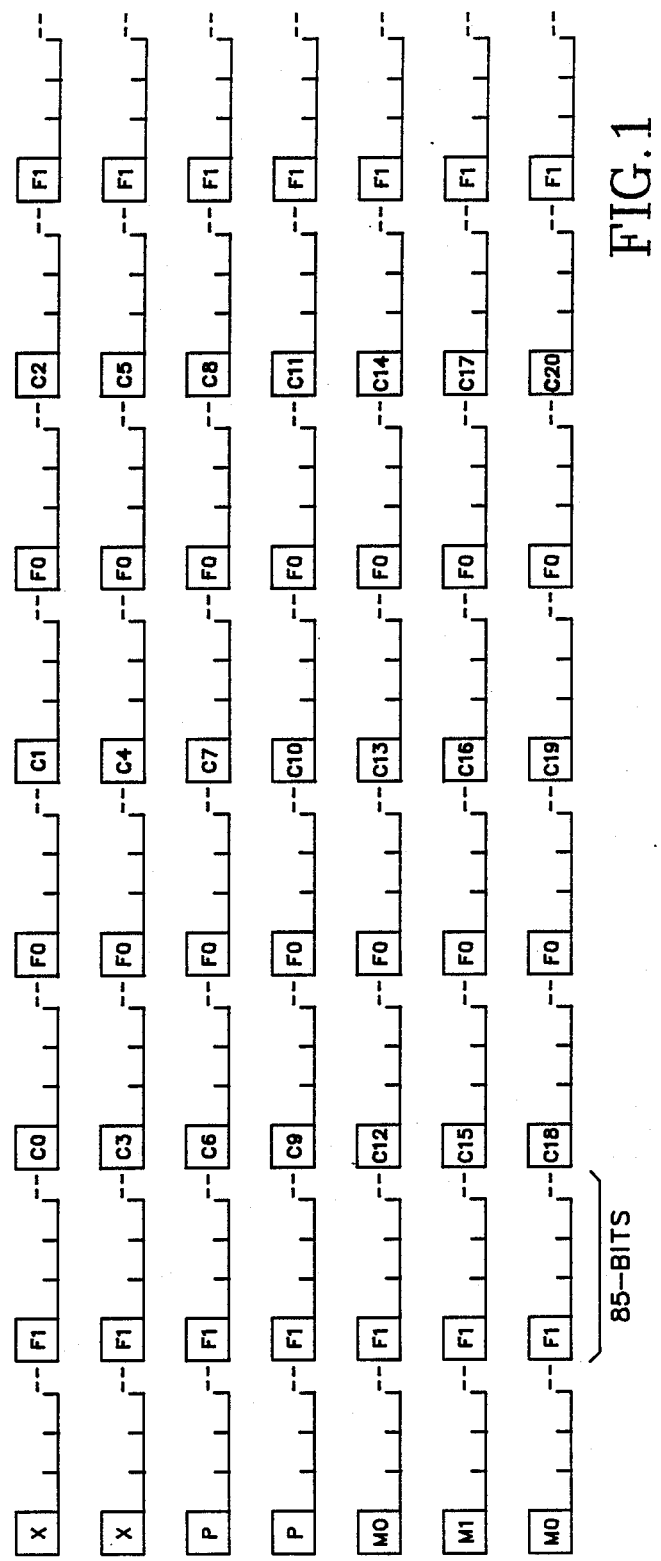
FIG. 1 is diagram of a master frame of data according to the DS3 format.
Figure 2:
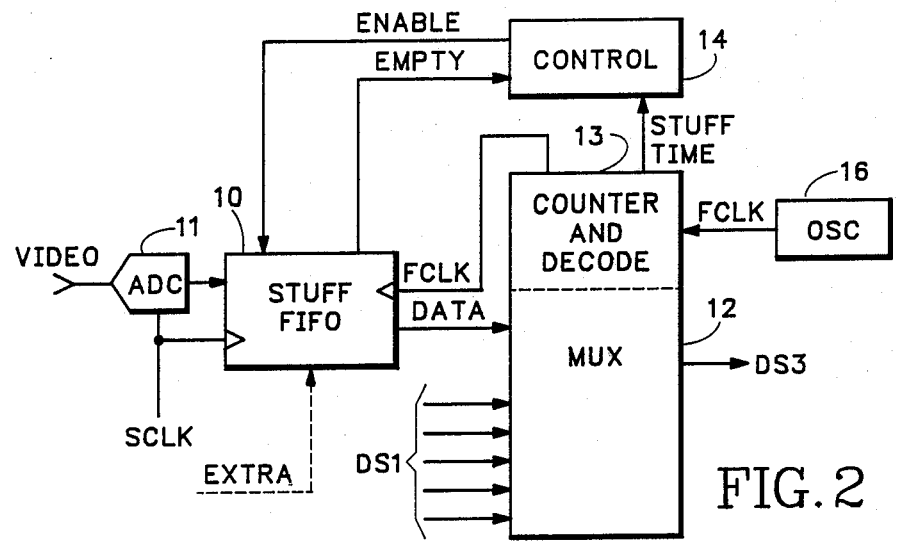
FIG. 2 is a block diagram of an encoding section for a codec according to the present invention.
Figure 3:
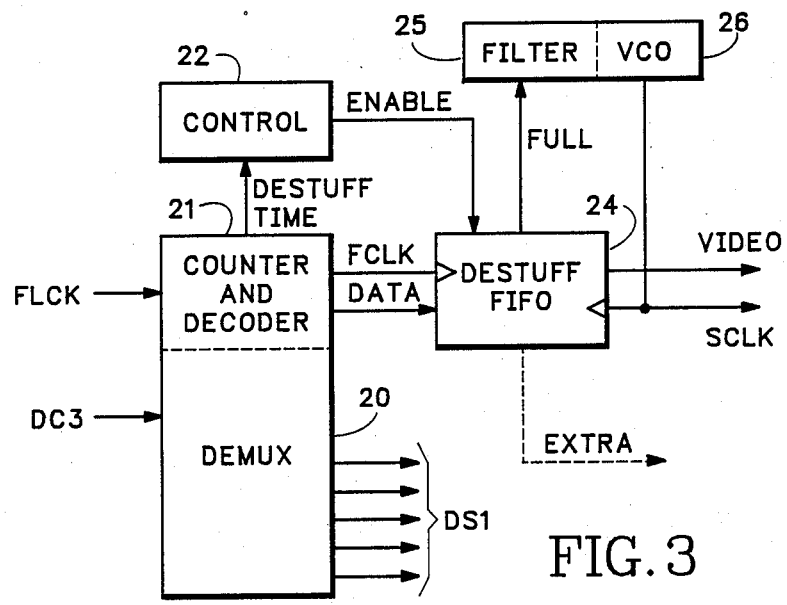
FIG. 3 is a block diagram of a decoding section for a codec according to the present invention.

Referring now to FIGS. 2 and 3 a digitized video signal from analog to digital converter 11 having a bit rate of 35.795 Mb/s is input to a stuff first in/first out (FIFO) buffer circuit 10 at a slow clock rate (SCLK) corresponding to the input bit rate. The output of the stuff FIFO 10 is input to a multiplexer 12 at a fast clock rate (FCLK) corresponding to the DS3 bit rate of 44.736 MHz. A control circuit 14 enables the stuff FIFO 10 at the subframe repetition rate of 65.788 kHz to generate a stuff word which has either a valid data bit included or a garbage data bit according to an almost empty indication (EMPTY) from the stuff FIFO. Optionally a telephone or audio signal is input to the stuff FIFO 10 for inclusion as one bit of the stuff word. The circuit timing is provided from a master oscillator 16 which provides the fast clock at the DS3 rate. A counter/decode circuit 13, which is part of the multiplexer 12, counts the FCLK pulses from the master oscillator 16 and provides decoded commands to the multiplexer 12 to select the desired data input lines for insertion of the data into the DS3 frame format. When video data is to be inserted into the frame, the FCLK is applied to the stuff FIFO 10. When the stuff word location within each subframe of the frame is decoded from the FCLK count, a stuff time signal is sent to the control circuit 14. If the stuff FIFO 10 is almost empty, then the stuff flag in the stuff word inserted by the stuff FIFO is not set and the stuff data bit contains a garbage bit. If the stuff FIFO 10 is not almost empty, i.e., there are several bits of video data remaining in the stuff FIFO, then the stuff flag is set and the video data bit is inserted into the stuff data bit as a valid bit. If an audio or telephone data bit (EXTRA) is to be transmitted, it is inserted into the stuff word for each subframe. The output of the multiplexer 12 is the DS3 master frame containing the complete video data, up to five DS1 data channels and optional audio or telephone data bits.

At the decode end the process is reversed. The DS3 channel from the digital transmission network is demultiplexed by a demultiplexer 20 into a video channel and up to five DS1 data channels under control of a decode control circuit 22. Also input to a counter/decode circuit 21 of the demultiplexer 20 is the fast clock at the DS3 data rate and the subframe position within the DS3 frame derived from the received DS3 data as is well known in the art. Again the counter/decode circuit 21 counts the FCLK pulses and provides decoded select commands to the demultiplexer 20 to output the video data and DS1 channels from the DS3 subframes. The video data from the demultiplexer 20 is input to a destuff FIFO 24 at the FCLK rate. At the point in each subframe where the stuff word is located a destuff time signal from the counter/decode circuit 21 is output to a control circuit 22 which generates an enable signal which is applied to the destuff FIFO 24. During the enable time the stuff word is received and decoded by the destuff FIFO 24 to recover the valid video bit, if present, and the optional EXTRA bit. A voltage controlled oscillator (VCO) 26 has a nominal frequency equivalent to the video transmission rate SCLK. A fullness signal FULL from the destuff FIFO 24 is applied to a filter 25 at the input of the VCO 26 and serves as a phase error indicator. If there is a valid data bit in the stuff word and destuff FIFO 24 is full, then the frequency of the VCO 26 is increased to read out the valid bit. If there is a valid data bit and the destuff FIFO 24 is almost full, then the VCO 26 is not adjusted. In this manner the data, which is input to the destuff FIFO 24 at FCLK, is read out as coherent video data at SCLK.

Thus the present invention provides a frame format for a video codec which allows video data to be sampled and output at the video data rate while combining the video data with other data channels for transmission at the DS3 data rate by use of FIFO buffers and a stuff word.

What is claimed is:

1. A video coder comprising:
   means for storing digital data at a first data rate and for reading out the digital data at a second data rate, the first and second data rates being asynchronous with respect to each other;
   means for coding a stuff word for addition to the storing means at a third data rate synchronous with the second data rate, the stuff word containing a valid digital data bit from the digital data when necessary to compensate for the rate differential between the first and second data rates; and
   means for multiplexing the digital data and the stuff word from the storing means with a plurality of other data channels having fourth data rates, the combination of the digital data, the stuff word and other data channels being in the form of a master digital data frame having a data rate equal to the second data rate.

2. A video coder as recited in claim 1 wherein the master digital data frame comprises a plurality of subframes, each subframe having data bits representing digital data sampled at the first data rate, having the stuff word, and having data bits representing the other data channels.

3. A video coder as recited in claim 2 wherein the stuff word further comprises a digital bit from an ancillary source at a fifth data rate.

4. A video decoder comprising:
   means for demultiplexing digital data, a stuff word and a plurality of other data channels having first data rates from a master digital data frame having a second data rate, the master digital data frame being a combination of the digital data, the stuff word and the other data channels;
   means for storing the digital data and the stuff word at the second data rate and for reading out the digital data at a third data rate, the second and third data rates being asynchronous with respect to each other; and
   means for decoding the stuff word, the stuff word occurring at a fourth data rate synchronous with the second data rate and containing a valid digital data bit of the digital data when necessary to compensate for the rate differential between the second and third data rates, the valid digital data bit being read out of the storing means as part of the digital data.

5. A video decoder as recited in claim 4 wherein the master digital data frame comprises a plurality of subframes, each subframe having data bits representing digital data sampled at the third data rate, including the stuff word, and having data bits representing the other data channels.

6. A video decoder as recited in claim 5 wherein the stuff word further comprises a digital bit from an ancillary source at a fifth data rate.

7. A video coder comprising:
  means for sampling a video input signal at a first data rate, the sampled video input signal being stored in a FIFO buffer;
  means for reading out the sampled video input signal from the FIFO buffer at a second data rate faster than and asynchronous with the first data rate;
  means for inserting a stuff word word into the sampled video input signal to compensate for the difference in rates between the first and second data rates, the stuff word containing a valid data bit when necessary to provide the compensation; and
  means for multiplexing the sampled video input signal, including the stuff word, with a plurality of other data channels that have third data rates slower than the first data rate and synchronous with the second data rate to produce a master data frame for transmission at the second data rate.

8. A video coder as recited in claim 7 further comprising means for inserting a digital bit from an ancillary source at a fourth rate into each stuff word.

9. A video decoder comprising:
  means for demultiplexing a master data frame transmitted at a first data rate into a video data channel and a plurality of other data channels;
  means for storing the data from the master data frame representing video data for the video data channel in a FIFO buffer at the first data rate, the stored data including a stuff word;
  means for reading out the stored data for the video data channel from the storing means, except the stuff word, at a second data rate slower than and asynchronous with the first data rate; and
  means for extracting from the stuff word a valid video data bit to compensate for the difference in rates between the first and second data rates when such compensation is necessary, the valid video data bit being added to the stored data for the video data channel from the storing means to produce an output video signal.

10. A video decoder as recited in claim 9 further comprising means for extracting a digital bit from each stuff word corresponding to digital data at a third data rate for an ancillary device.

* * * * *